United States Patent [19]

Brown

[11] 4,344,469
[45] Aug. 17, 1982

[54] LIQUID TRANSFER APPARATUS
[75] Inventor: Gregory J. Brown, San Jose, Calif.
[73] Assignee: FMC Corporation, Chicago, Ill.
[21] Appl. No.: 157,599
[22] Filed: Jun. 9, 1980
[51] Int. Cl.³ ............................ B08B 9/08; B65B 3/04
[52] U.S. Cl. .................................. 141/90; 134/22 R; 137/240; 137/892; 141/91; 141/107; 141/296; 141/392
[58] Field of Search ............. 134/22 R; 137/238, 240, 137/892, 566; 141/18, 89–92, 94, 102, 104, 105, 107, 292, 296, 311 A, 392; 222/148

[56] References Cited
U.S. PATENT DOCUMENTS

| | | | |
|---|---|---|---|
| 3,612,356 | 10/1971 | McVey | 222/145 |
| 3,728,157 | 4/1973 | Griparis | 134/22 R |
| 3,753,445 | 8/1973 | Johnston | 137/322 |
| 3,797,744 | 3/1974 | Smith | 134/102 |
| 3,802,447 | 4/1974 | Bender | 134/57 R |
| 3,880,206 | 4/1975 | Johnston | 141/5 |
| 3,976,087 | 8/1976 | Bolton et al. | 137/240 |
| 4,171,710 | 10/1979 | Boynton et al. | 137/238 |
| 4,195,672 | 4/1980 | Freeman | 141/91 |
| 4,254,805 | 3/1981 | Reeder | 141/91 X |

OTHER PUBLICATIONS
"Closed Transfer System"; FMC Corporation.
"Blackwelders 'Pestran' Closed Transfer and Metering Systems"; Blackwelders Corporation.
"Chemprobe-A Removable Drybreak Probe"; Cherlor Mfg. Co.; Inc.

Primary Examiner—Frederick R. Schmidt
Attorney, Agent, or Firm—Louis J. Pizzanelli; Richard B. Megley

[57] ABSTRACT

Disclosed is a fluid pesticide transfer system, comprising a measuring vessel and a pesticide container coupled together by conduits and valves operating to entrain and mix pesticide with water as transfer occurs between the vessel and the container. A suction tube in the container extracts and transfers liquid containing pesticide and concurrently introduces rinsing water in the container to effect cleaning.

16 Claims, 6 Drawing Figures

FIG_1

FIG_2

FIG_3

FIG_4

FIG_5

FIG_6

LIQUID TRANSFER APPARATUS

BACKGROUND OF THE INVENTION

1. Field of the Invention

The present invention generally relates to an apparatus for transferring liquids from one container to another and more particularly concerns an apparatus for transferring toxic liquids, such as pesticide, from a supply container to another container, such as a sprayer tank, that is capable of rinsing the supply container after the toxic liquid has been withdrawn therefrom.

2. Description of the Prior Art

Recent government regulations have provided that liquid pesticides must be handled with a transfer system that substantially eliminates the possibility of pesticide spillage during the transfer of the pesticides from their supply container to the holding tank of a sprayer. The regulations also provide that the transfer system must include means for flushing the pesticide container with water after the container has been emptied and for recirculating the rinse liquid either back to the sprayer tank or to some other vessel where it can be disposed of without contaminating the environment or otherwise becoming a source of danger to farm workers.

The known prior art pesticide transfer systems generally include a housing containing a pump, a measuring vessel, and a relatively complex arrangement of valves and switches. The systems include at least one set of suction and rinse hoses that lead from the housing to a nozzle assembly which is adapted to be detachably mounted in the closure of a pesticide supply container. A further hose extends from the housing to the sprayer tank to which pesticide is to be transferred and another hose leading between a rinse water container and the housing. Briefly stated, the user first manipulates the controls to pump pesticide from the pesticide container into the measuring vessel until a selected volume thereof is accumulated in the measuring vessel, as indicated by volumetric markings on a translucent section of the side wall of the measuring vessel. Thereafter, the user resets the controls and pumps the measured volume of pesticide from the measuring vessel directly to the sprayer tank. Finally, in the event the pesticide supply container has been emptied during the measuring operation, the user again resets the controls and pumps water from the water container through the rinse hose into the pesticide supply container to thoroughly flush the container and make it safe for disposal. During such rinsing step, the rinse water is usually pumped from the container to the sprayer tank.

In some of the prior known pesticide transfer systems, the nozzle assembly, commonly referred to as a rinse and suction probe, is fastened to the closure neck of the pesticide supply container so that it may be left attached until the pesticide container is emptied. After transfer, either the rinse and suction hoses are detached from the associated ports of the probe or a tube section of the probe is left in the supply can and a removable part of the probe is detached from the tube section. In such prior art systems, when a substantial volume of pesticide remains in the supply can after a transfer operation and it is desired to transfer a different pesticide from another supply can so that it is possible to mix said different pesticide with the pesticide already in the measuring vessel, the rinse and suction hoses or the aforesaid detachable part of the probe is detached from the partially depleted can, and the rinse and suction hoses or the aforesaid tube section is connected to the other supply can so that the different pesticide can be removed from said other can. To prevent spillage of the pesticide check valves are mounted either in the ends of the hoses or in the removable part of the probe.

From the foregoing description, it will be appreciated that the prior art pesticide transfer systems are subject to a number of shortcomings. Since all or part of the probe is left sealed within the closure of a pesticide can when pesticide is left in the can, the user must have several probes (or tube sections thereof) available if several pesticides are to be mixed and transferred to the sprayer tank. It will be recognized that such probes (or tube sections) are relatively expensive, and thus the requirement to have several probes available for multiple pesticide transfers makes the overall system considerably more expensive than a system which would employ only one probe.

SUMMARY OF THE INVENTION

According to the present invention, a liquid transfer system that is especially suitable for transferring pesticides includes a measuring vessel and a probe having separate rinse and suction tubes which are insertable into a pesticide container or can. During extraction of pesticide from the pesticide container, only a part of the pesticide withdrawn through the suction tube is directed to the measuring vessel, and the remainder thereof is simultaneously pumped directly to the sprayer tank. When it is desired to rinse the pesticide container after all of the pesticide has been pumped from the container, the measured volume of pesticide that was previously transferred to the measuring vessel is pumped from the measuring vessel to the sprayer tank along with the rinsing liquid.

In the preferred embodiment of the transfer system of the present invention, conduits and valves are provided for coupling the outlet of the measuring vessel to the rinse hose to cause the pesticide within the vessel to be entrained in the rinse water that is being pumped to the pesticide container. The system further includes suction means for concurrently extracting the rinse water and pesticide mixture from the pesticide container (or rinse receptacle, as hereinafter discussed) through the suction tube of the probe. This rinsing is continued for a period after the measured volume of pesticide has been completely withdrawn from the measuring vessel to assure that the pesticide container has been flushed with rinse water for enough time to clean its interior.

The present transfer system preferably further includes a rinse receptacle into which the probe may be inserted after the initial transfer of the measured volume of pesticide to the measuring vessel. The rinse receptacle functions as a dummy pesticide can to enable the mixture of pesticide and water to be circulated in the manner previously described until all pesticide has been withdrawn from the measuring vessel and transferred through the receptacle to the sprayer tank.

DESCRIPTION OF THE PREFERRED EMBODIMENT

Figure 1:
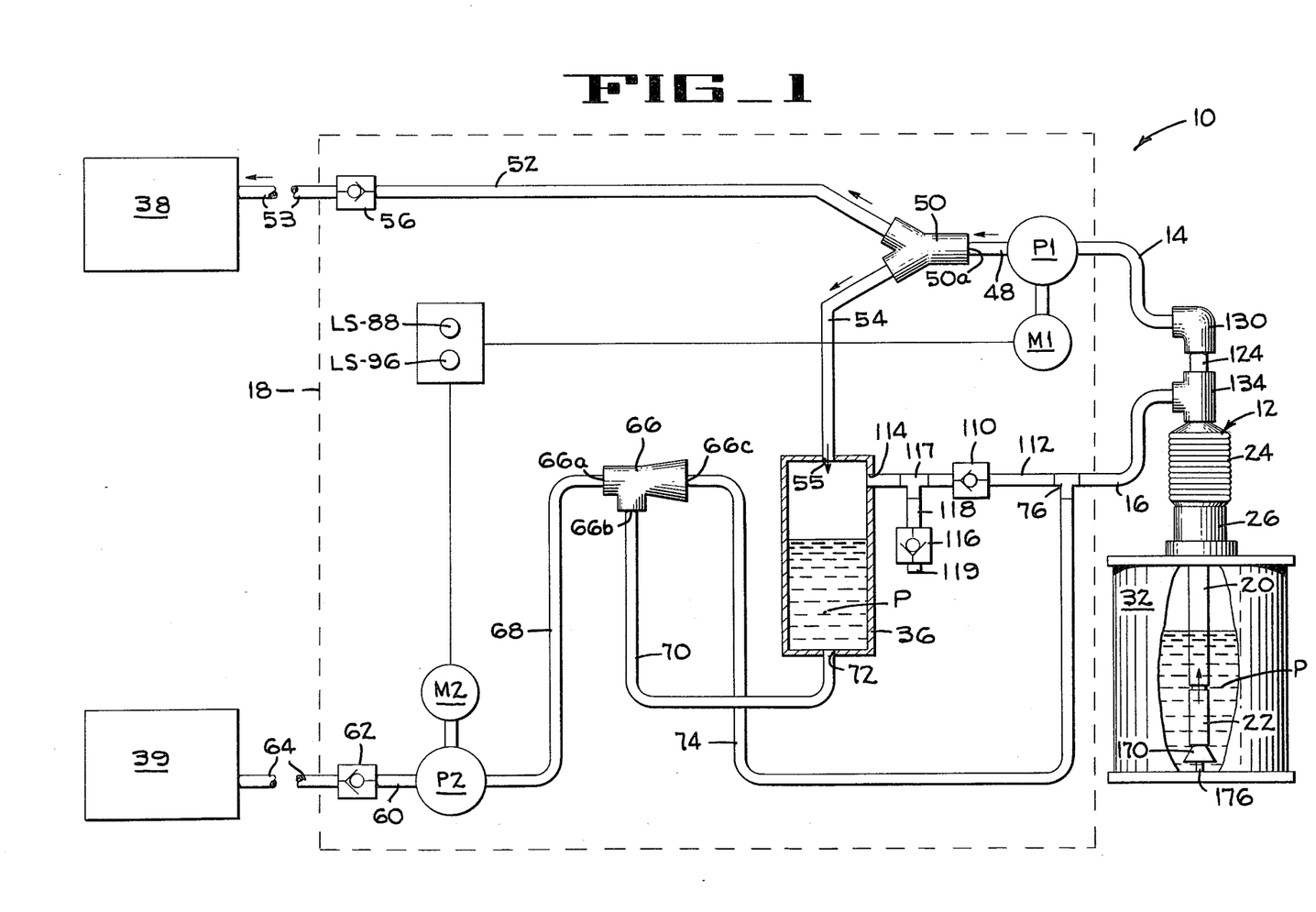
FIG. 1 is a schematic diagram of the pesticide transfer system of the present invention, with the suction and rinse probe being shown within the pesticide container from which pesticide is being transferred.
Figure 4:
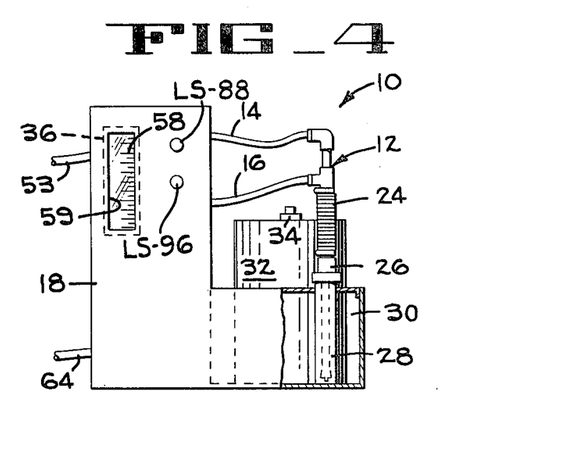
FIG. 4 is a side elevation of the transfer system which is broken away in part to show the rinse receptacle into which the probe is inserted so that the pesticide within the measuring vessel may be directed through the probe into rinse receptacle and from the rinse receptacle to the sprayer tank.

Referring now to FIGS. 1 and 4, it will be seen that a pesticide transfer system 10 includes a suction and rinse probe 12 having a suction hose 14 and a rinse hose 16 connected to and extending therefrom into a housing 18. The probe 12 includes concentrically arranged rinse and suction tubes 20 and 22, respectively, and a collapsible shroud 24 adapted to normally extend over the tubes 20 and 22 and having a splash collar 26 at the lower end thereof adapted to fit over the closure neck and spout 34 (FIG. 4) of a pesticide container 32. The housing 18 is provided with a well 30 (FIG. 4) for receiving a pesticide container 32, and a rinse receptacle 28 is mounted in the side wall of the housing well for receiving the probe, as will be hereinafter described. As shown in FIG. 1, the rinse and suction tubes of the probe are inserted into the closure opening of the pesticide container when pesticide is to be transferred from the pesticide container to a measuring vessel 36 mounted within the housing 18 and concurrently to the tank 38 of a sprayer (not shown). As will be described below in detail, the closed transfer system 10 includes extraction pump means attached to the suction hose 14 for withdrawing liquid pesticide from the pesticide container 32 and directing a selected portion of the withdrawn pesticide to the measuring vessel 36 and a remainder thereof to the sprayer tank 38. The system further includes rinse pump means for supplying water from a water supply tank 39 under pressure to the rinse hose 16 while withdrawing the pesticide from the measuring vessel into such rinse water flow for subsequent injection either into the rinse receptacle (as shown in FIG. 4) or the pesticide container. The system is adapted to concurrently withdraw the mixture rinse water and pesticide from the rinse receptacle, or pesticide container, and to eventually transfer all of the measured volume of pesticide to the sprayer tank.

Figure 5:
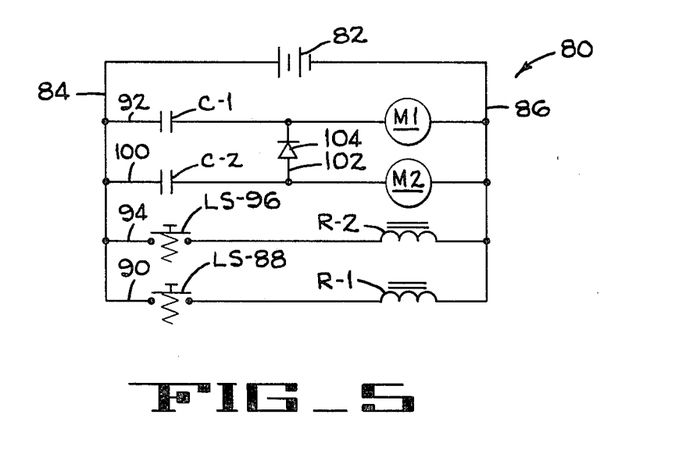
FIG. 5 is a schematic diagram of the electrical control circuit of the transfer system.

As depicted in FIGS. 1 and 5, the extraction pump means of the system includes a first pump P1, which is driven by a first motor M1, for transferring pesticide from the pesticide container 32 to the measuring vessel 36 and concurrently to the sprayer tank 38. The rinse pump means of the system includes a second pump P2, which is driven by a second motor M2; the pump P2 is driven concurrently with the first pump P1 to pump water to the probe while withdrawing the pesticide within the measuring vessel into the rinse water and for concurrently pumping the pesticide and rinse water solution from the rinse receptacle 28 (or a pesticide container, as desired), and transferring it to the sprayer tank 38. During this rinsing operation, the measuring vessel receives a portion of the flow from the suction hose 14, but the measuring vessel is more rapidly drained of such fluid than the rate at which the fluid is provided thereto, as described hereinafter. Pumps P1 and P2 are identical pumps. For example, the Model N4100C flexible roller pump manufactured by the Hypro Division of Lear Siegler of St. Paul, Minn. may be used. The motors M1 and M2 are $\frac{1}{4}$ Hp D.C. motors manufactured by Applied Motors, Inc. of Rockford, Ill.

The inlet of the extraction pump P1 is connected to the suction hose 14, and outlet of the extraction pump is connected to a conduit 48 which communicates with the inlet port 50a of a hydraulic flow divider 50. The flow divider divides the input flow equally between two outlet conduits 52 and 54. A suitable flow divider is the Model 1489T-8-1 flow divider manufactured by the Fluid Components Division of Gould, Inc. of Chicago, Ill. The conduit 52 communicates with a hose 53 which leads to the sprayer tank 38, and a check valve 56 is connected between conduit 52 and the hose 53 to permit flow only in the direction of the sprayer tank. The other conduit 54 leading from the flow divider is connected to an inlet port 55 formed in the top wall of the measuring vessel 36.

The measuring vessel is an elongate container made of a clear material such as glass and is vertically mounted within the housing 18 adjacent an opening 59 (FIG. 4) which is formed in the adjacent side wall of the housing. A clear plastic sheet having volumetric indicia 58 thereon is longitudinally arranged adjacent the outside wall of the vessel such that the operator of the system may refer to the indicia 58 to readily determine the total volume of pesticide dispensed from the pesticide container through the flow divider 50. The volumetric indicia correlate to the proportion of flow between the measuring tank and the external tank from the flow divider so as to indicate the total volume of flow through the flow divider, rather than the volume actually present in the measuring vessel. Thus, for a system which includes a flow divider which splits the flow evenly between the measuring vessel and the holding tank, the indicia will indicate volumetric values which correspond to twice the actual volume in the vessel.

As stated above, the rinsing means of the closed transfer system is adapted to transfer the pesticide from the measuring vessel to the sprayer tank and to concurrently flush the pesticide container or the rinse receptacle with water. The inlet of the rinse pump P2 is connected to a conduit 60 which leads to a check valve 62. The check valve 62 is connected between the conduit 60 and a conduit 64 to enable flow only from tank 39 to the pump. An inlet 66a of a mixing valve 66 is connected to a conduit 68 which is connected to the outlet of the pump P2. The mixing valve 66 serves to entrain the pesticide contained in the measuring vessel within the water flow from the rinse pump. The mixing valve may also be referred as an induction valve or a jet pump. For example, a suitable mixing valve is a Model 62A Jet Pump sold by Penberthy Division of Hondaille Industries of Prophetstown, Ill. The valve has a second inlet port 66b connected to a conduit 70 leading from an outlet port 72 formed in the bottom wall of the measuring vessel. The outlet port 66c of the mixing valve is connected to a conduit 74 which communicates with the rinse hose 16 through a three-way connector 76. When the rinse pump is energized, water under pressure is forced through the mixing valve, and the energy of the water flow through the valve creates a negative pressure at the second inlet port 66b, to thereby suck pesticide from the measuring vessel through conduit 70 into the water flow entering port 66a of the mixing valve.

The mixing valve 66 is selected to create sufficient negative pressure on the fluid in the conduit 70 connected to the measuring vessel drain to drain the measuring vessel more quickly than it is filled during the rinsing-transfer operation. After the rinse and extraction pumps are operated concurrently for a period of time, all of the pesticide in the measuring vessel will be transferred to the sprayer tank. During such period of time, the mixture of rinse water and pesticide is pumped to the pesticide container (or rinse receptacle) and part of such mixture is directed by the flow divider via conduit 54 into the measuring vessel. Eventually, due to the more rapid draining of the measuring vessel only water will enter the measuring vessel and such water will be completely drained as it enters the vessel. As will be explained below, irrespective of whether the probe 12 is inserted into the rinse receptacle or an emptied pesticide container during the rinsing-transfer operation, the operator will continue to pump water through the closed transfer system for a substantial period after the measuring vessel has been drained. Such continued rinsing will assure that the measuring vessel, mixing valve, extraction pump and the associated conduits will be thoroughly flushed with water. This continued rinsing assures that one pesticide will not be mixed with the next pesticide being transferred. Moreover, by purging all of the pesticide from the elements of the system, including the probe, such elements may be made from materials which are not necessarily capable of withstanding corrosion due to prolonged contact with the pesticide, thereby reducing the cost of such elements and minimizing maintenance problems.

As diagrammatically shown in FIG. 1, the mixing valve 66 is mounted in the housing 18 higher than the upper end of the measuring vessel 36. Such mounting prevents the pesticide from draining from the measuring vessel as it is pumped thereto from the pesticide container 32. It will be recognized that a relatively small volume of pesticide will be retained in the conduit 70 extending between the measuring vessel and mixing valve. However, the volume markings 58 (FIG. 4) on measuring vessel are calibrated to compensate for this small volume in the connecting conduit 70.

It will be appreciated that means other than a mixing valve may be provided to serve the function of mixing the pesticide with the rinse water when the rinse pump is energized and also that other means may be used to prevent pesticide from draining from the measuring vessel before the rinse pump is energized. For example, in lieu of the valve 66, a float valve (not shown) may be incorporated in the outlet 72 of the measuring vessel, and the conduit 70 may be connected upstream from the rinse pump, that is, to the conduit that leads to the inlet of the pump; thus, when the pump is energized, the float in the outlet will permit flow from the vessel into such conduit leading to the pump. In such an alternative embodiment, when the measuring vessel is emptied, the float is adapted to substantially close the outlet 72, but to permit the water or mixture of water and pesticide pumped into the measuring vessel during the rinsing operation to be withdrawn at least as rapidly as it is supplied thereto.

The control circuitry 80 for operating the extraction and rinse motors M1 and M2, respectively, is shown in FIG. 5 to include a 12 volt D.C. battery 82 and a pair of main leads 84 and 86 extending therefrom. A first relay R-1 connected to lead 90 in series with a normally open measure switch LS-88. A normally open contact C-1 associated with the relay R-1 are connected to another lead 92 in series with the extraction motor M1, such lead 92 extending between the main leads 84 and 86. Thus, it will be seen that when the measure switch LS-88 is actuated, the contacts C-1 will close to thereby energize the extraction motor. The actuator of the measure switch LS-88 is a button which is spring-loaded so that when the button is released, the extraction motor will be immediately de-energized to stop the flow of pesticide to the measure vessel and sprayer tank.

The control circuit 80 further includes a second relay R-2 which is connected to a lead 94 in series with a normally open rinse switch LS-96; such lead 94 being connected between the main leads. The second relay closes a normally open contact C-2 connected to a lead 100 in series with the rinse motor M2; such lead 100 is also connected between the main leads 84 and 86, and a diode 104 is connected to the lead 102 in a manner to permit current flow from the relay contact C-2 to both the rinse motor M2 and the suction motor M1, but to interrupt current flow from the contact C-1 to the rinse motor M2. Accordingly, when the actuator of the rinse switch LS-96 is depressed, the rinse and suction motors will be concurrently energized. The actuator of the switch LS-96 is also a spring-loaded push-button so that when it is released both motors will be simultaneously stopped.

Referring to FIG. 1, the transfer system also includes a venting conduit and valves for preventing the extraction pump P1 from drawing a vacuum on the pesticide container so as to collapse the container, to prevent the rinse pump P2 from drawing a vacuum on the measuring vessel, and also for providing an overflow path between the measuring vessel and the pesticide container to prevent the measuring vessel from being pressurized. A first check valve 110 is provided in a conduit 112 connected between the rinse hose 16 and a bypass port 114 formed in the upper end of the measuring vessel. The check valve 110 is arranged in conduit 112 to permit flow only from the measuring vessel to the rinse hose. Another check valve 116 is connected in a conduit 118 which is connected to the conduit 112, by a connector 117, at a point between the check valve 110 and the bypass port 114. The outer end 119 of the conduit 118 is open to the atmosphere within the housing 18, and the check valve 116 is connected to the conduit 118 to permit air flow from the atmosphere to the conduit 112. With this conduit and valving system, if the extraction pump P1 should be operated after all of the pesticide has been withdrawn from the container, air may be drawn from the atmosphere into the conduit 118, through the check valve 116, through the conduit 112 and the check valve 110, and finally through the rinse hose 16, to thereby relieve any negative pressure created within the pesticide container. The jet pump could possibly produce a negative pressure in the conduit 70 to thereby tend to collapse the measuring vessel. However, this can be avoided by the venting system including the conduit 112, the conduit 118 and the check valve 116. To prevent the measuring vessel from being over-filled with pesticide, the liquid in the vessel can flow through the conduit 112 and the check valve 110 to the rinse hose 16 and back into the pesticide container 32.

Figure 2:
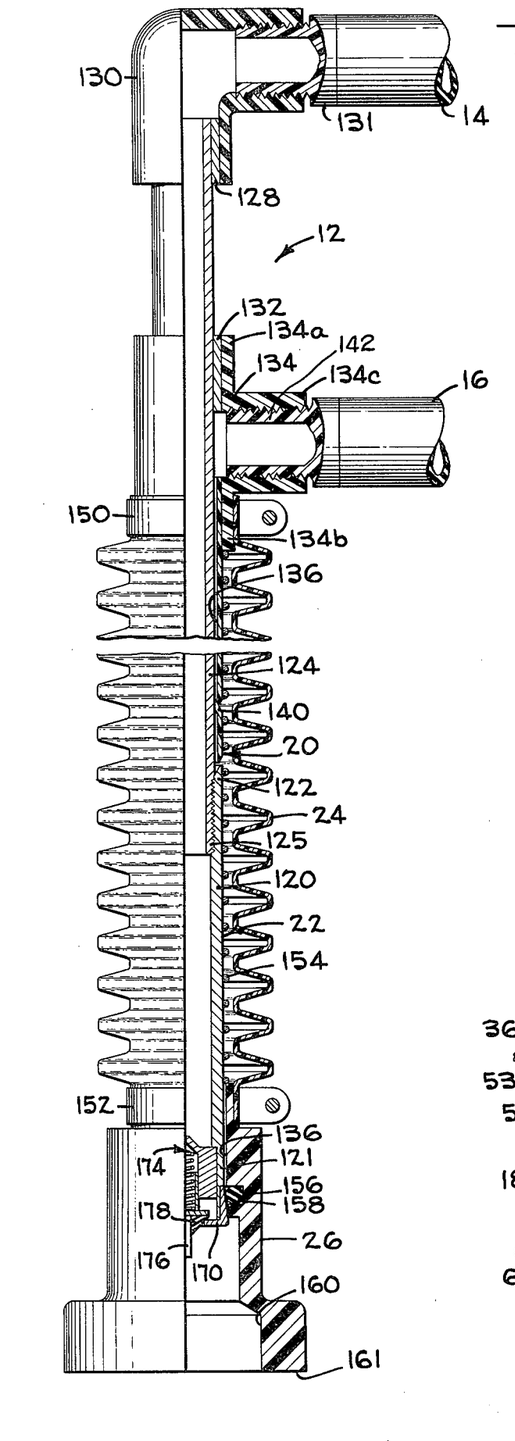
FIG. 2 is a quarter section of the suction and rinse probe of the pesticide transfer system.
Figure 3:
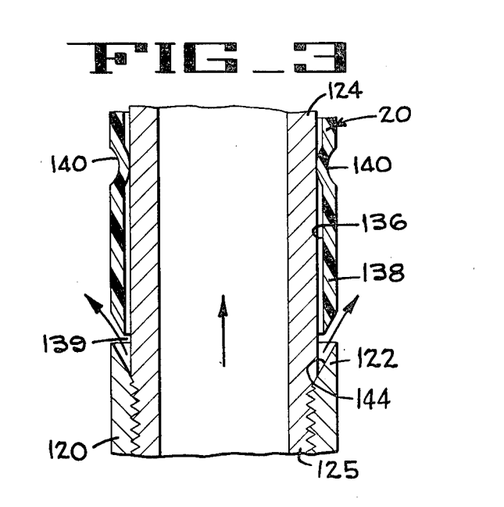
FIG. 3 is an enlarged fragmentary section which illustrates the rinse port formed between the rinse and suction tubes of the probe.

The suction and rinse probe 12 will now be described in connection with FIGS. 2, 3 and 6. Referring to FIG. 2, the rinse and suction tubes 20 and 22 of the probe 12 is comprised of a large diameter, outer section 120 having a threaded bore at its innermost end 122 and a longer, reduced diameter, inner section 124 having a threaded end connected to the outer section 120 of the rinse tube. The innermost end of the inner section 124 of the suction tube is affixed within the bore of a bushing 128 received in an arm of an elbow 130. The inner section 124 is also affixed within the bore of a bushing 132 which, in turn, is engaged within the bore of one arm 134a of a three-way, T-shaped connector 134. The inner section extends concentrically through the bore of an opposing arm 134b of the T-connector. A connector 131 is mounted in the radially extending arm of the elbow 130, and the suction hose 14 is engaged on the connector 131.

The rinse tube 20 is a section of pipe having an outer diameter which is equal to the outer diameter of the enlarged diameter, outer portion 120 of the suction tube. The tube 20 has an inner diameter which is greater than the outer diameter of the inner section 124 of the suction tube and the inner end thereof is affixed within the bore of the lower arm 134b, with the upper section 124 being concentrically spaced therefrom to thereby form an annular rinse passageway 136 (see FIGS. 2 and 3). As may best be seen in FIG. 3, the outermost end 138 of the rinse tube is axially spaced from the innermost end 122 of the section 120 of the suction tube to form an annular rinse outlet 139. Dimples 140 are formed near the outer end of the rinse tube 20 to provide the appropriate spacing between the inner section 124 of the suction tube and the bore of the suction tube section 120. The inner end 122 of the rinse tube is conically counterbored to form a deflector surface 144 which extend upwardly and outwardly from the inner section 124. Such conical deflector surface is adapted to direct the rinse solution outwardly and upwardly so as to spray the upper surfaces of the pesticide container, the spray being indicated by the smaller arrows in FIG. 3. It will be seen that the outer end of the rinse tube is chamfered to permit the rinse water to be directed upwardly toward the top wall of a pesticide container. The radially extending third arm 134c of the three-way connector 134 has a suitable connector 142 engaged therein for operatively connecting the rinse tube 16. Thus, it will be seen that the rinse water is directed through the arm 134c of the connector 134 into the rinse passageway 136 and therefrom through the port 139 into the pesticide container or rinse receptacle.

As previously stated, the probe further includes a collapsible shroud 24. The inner end of the shroud is secured by a band 150 to the arm 134b of the connector 134, and the outer end thereof is affixed by a band 152 to the upper end of the splash collar 26. The collapsible shroud is a tubular, flexible bellows. A helical spring 154 is concentrically mounted between the rinse and suction tubes and the shroud for the purpose of urging the shroud into the extended position shown in FIG. 2 as the probe is removed from a pesticide container. The spring is engaged between the upper end of the splash collar and the opposing connector arm 134b. The splash collar has a bore 136 in its upper end which is slightly larger than the diameter of the lower section of the suction tube. As best seen in FIG. 6, an annular recess 156 is formed in this upper bore, and an elastomeric O-ring or gasket 158 is received within the recess for forming a generally fluid-tight, slidable seal the exterior surface of the suction and rinse tubes. The outermost or tip end 121 of the outer section 120 of the suction tube has a frustoconical cup 170 affixed thereto which tapers outwardly so as to form a sealing and stopping surface 171 against which the O-ring 158 within the splash collar is adapted to abut. The lower end of the splash collar is outwardly flanged and has a bore 160 (FIG. 2) formed therein which is adapted to fit over the closure neck of the pesticide container so that the flat annular bottom surface 161 of the collar may rest firmly against the top wall of the pesticide container.

As previously stated, the purpose of the shroud and the splash collar arrangement is to provide means for wiping pesticide from the exterior surface of the suction and rinse tubes as they are withdrawn from the pesticide container. As illustrated in FIG. 1, during a pesticide transfer operation, the splash collar of the probe is cupped over the closure of the pesticide container, and the probe is pushed downwardly to partially collapse the shroud and spring while inserting the suction and rinse tubes into the container. As the probe is removed from the pesticide container, the spring forces the splash collar downwardly to hold the splash collar against the container while the O-ring 158 wipes the pesticide from the exterior surfaces of the rinse tube and the outer section 120 of the suction tube. In the final position of the splash collar, the fluid-tight seal is formed between the O-ring and the frustoconical outer surface 171 of the cup 170 at the tip of the suction tube, and the shroud completely covers the exterior surfaces of the suction and rinse tubes which were immersed in the pesticide and thus prevents contact within any residual pesticide remaining on such portions of the probe assembly before the probe is rinsed.

Figure 6:
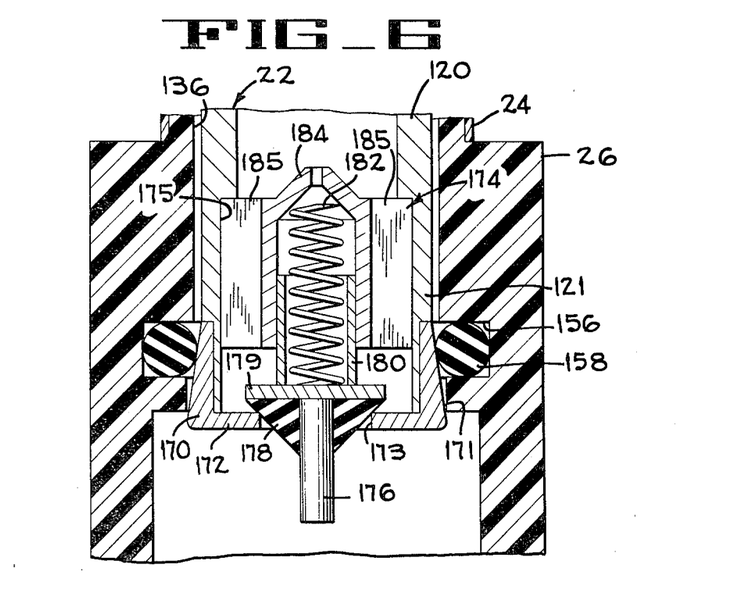
FIG. 6 is an enlarged fragmentary section showing the check valve in the tip of the suction tube of the probe.

As best seen in FIG. 6, the suction tube has a bottom wall 172 formed by the bottom wall of the cup 170 and an aperture 173 is formed in the center of the wall 172. A check valve 174 is secured within a counterbore 175 formed in the tip end 121 of the outer suction tube section 120. The check valve includes a plunger 176 which extends through the aperture 173. A frustoconical gasket 178 is engaged on the inner end of the plunger to normally form a fluid-tight seal with the wall 172. The plunger extends perpendicularly outwardly from the bottom wall 179 of a piston 180, such wall extending radially outwardly of the piston so as to form an annular surface against which the gasket abuts. A spring 182 is engaged within the bore of piston 180 so as to normally force the gasket into the fluid-tight seal with the bottom wall 172. One end of the spring is received in the bore of a bushing 184 which has a bore for guiding the piston 180. Wings 185 are formed on the sides of the bushing. To open the check valve, the suction tube is fully inserted into a pesticide container (or the rinse receptacle) to the extent that the tip of the plunger is pushed upwardly by the bottom wall of the pesticide container (or rinse receptacle). When the probe is lifted from a pesticide container the check valve closes and prevents any pesticide from draining from the suction tube.

The operation of the pesticide transfer system 10 shall now be described in connection with FIGS. 1 and 4. The pesticide container or containers 32 from which pesticide is to be transferred to the sprayer tank 38 are placed in the well 30 of the housing 18. The closure cap of a pesticide container is removed, and then the probe is moved to a position such that the bore 160 of the splash collar 26 surrounds the closure neck of the pesticide container. The probe is grasped between the elbow 130 and the three-way connector 134 and is pushed downwardly to insert the rinse and suction tubes 20 and 22 downwardly into the pesticide container. The probe is pushed downwardly until the plunger 176 of the check valve 174 in the tip end of the probe is depressed against the bottom wall of the pesticide container, to thereby permit flow into the probe. The measure switch LS-88 is then depressed to energize the extraction motor M1 and thus to drive the extraction pump P1. The operator will thus have one hand engaging the probe to hold it down within the pesticide container and his other hand depressing the measure switch. At this time, the operator refers to the volumetric markings 58 superimposed over the side wall of the measuring vessel 36, and he continues to depress the measure switch until the pesticide accumulates within the measuring vessel to the selected volume to be transferred, or mixed, as indicated by the appropriate marking. He then releases the measure switch, thereby stopping the extraction pump. At this point, one fraction of the pesticide withdrawn from the pesticide container has been transferred to the measuring vessel and the other has been transferred directly to the sprayer tank.

Assuming no pesticide remains in the pesticide container after such transfer, the operator can simply push the rinse switch LS-96 to initiate the flushing of the pesticide container and to simultaneously transfer the pesticide within the measuring vessel to the sprayer tank. By depressing the rinse switch, as indicated above, both the extraction and the rinse motors M1 and M2 are energized to thereby concurrently drive the extraction and rinse pumps P1 and P2. The operator will again refer to the measuring vessel to assure that all of the pesticide therein is transferred to the sprayer tank. After the pesticide has been transferred to the sprayer tank, the operator may continue to flush the pesticide container, together with the entire transfer system.

It should be noted at this point that the rinse port 139 is adapted to spray rinse water over the entire upper portion of a pesticide container. In this manner, the water sprayed against the upper portion of the interior of the pesticide container washes the entire interior surfaces of the container as it flows down from such upper portion toward the bottom of the container.

In another case, when some pesticide remains in the particular container from which pesticide has been transferred and that no other pesticide is to be mixed with the pesticide in the measuring vessel, the operator may then remove the probe from such pesticide container and transfer it to the rinse receptacle 28. As the probe is removed from the pesticide container, the check valve 174 in the tip end of the probe will automatically close to prevent the pesticide in the suction tube from draining therefrom. The splash collar 26 will remain firmly engaged against the top wall of the pesticide container around the closure neck as the probe is pulled from the container due to the force of the spring 154 thereon. The collapsible shroud 24 will thus extend as the probe is removed, and the O-ring 158 within the splash collar will wipe practically all of the pesticide from the lower section 120 of the suction tube 22 and from the rinse tube 20 as such tubes are telescoped through the O-ring and the O-ring will form a seal with the surface 171 at the tip of the probe. Thus, when the probe is finally lifted from contact with the top wall the pesticide container, no pesticide will drip from the exterior or the interior of the probe. Also, as it is lifted, the shroud 24 and splash collar 26 will move to the normal position completely enclosing the surfaces of the probe which were immersed into the pesticide, thereby preventing accidental contact with such surfaces.

The operator next transfers the pesticide within the measuring vessel to the sprayer tank by first inserting the probe into the rinse receptacle 28 until the check valve 174 is opened by engaging the plunger 176 against the bottom wall of the rinse receptacle. Then, while holding the probe with one hand, the rinse switch LS-96 is depressed. Water will then be directed through the mixing valve 66 to thereby entrain the pesticide within the measuring vessel within the water flow in the conduit 74. Such mixture of water and pesticide will be sprayed through the rinse port 139 into the rinse receptacle, as shown in FIG. 3. Such mixture will be withdrawn through the suction tube and directed to the sprayer tank. As indicated above, the mixing valve is selected to drain the measuring vessel more quickly than the mixture of water and pesticide (and later water alone) is supplied thereto, thereby assuring that the mixture of water and pesticide is removed from the measuring vessel and subsequently that it is emptied of the water. The rinse switch is depressed for some time after the measuring vessel has been emptied, thereby purging the entire system of any pesticide therein and transferring it safely to the sprayer tank.

It is then possible to remove the probe from the rinse receptacle and place it in another pesticide container to transfer a different pesticide to the sprayer tank. It should be noted that it is not necessary to rinse the probe between transfers of pesticides from different container. It will be appreciated that if the probe is not rinsed within the rinse receptacle or within a pesticide container, some pesticide will remain within the probe so that when the probe is subsequently inserted into another pesticide container, such pesticide may flow into the pesticide container when the check valve 174 is opened. However, such residual pesticide will be transferred with such other pesticide in the ensuing transfer operation. The transfer system 10 thus permits pesticides of different types to be mixed within the measuring vessel. This is simply accomplished by withdrawing a probe from one pesticide container and inserting it in the pesticide container having another type of pesticide therein, and then transferring the desired volume of the pesticide from such second container to the measuring vessel and the sprayer tank. After such mixing operation, the probe may be inserted into the rinse receptacle to transfer the two types of pesticide within the measuring vessel to the sprayer tank.

The pesticide transfer system of the present invention will be realized to have many advantages. The system is very simple to operate, there being only a rinse switch and a mearsure switch. The system eliminates the need for a number of probes when more than one pesticide is to be transferred and thus also eliminates the multiple valves or switches associated with prior systems having several probes which were attached to several pesticide containers. The system of the present invention operates rapidly due to the fact that the rinse and transfer operations are conducted simultaneously. Another advantage is that all of the elements exposed to pesticide are washed with the rinse water during the flushing of the pesticide container or the rinse receptacle, thereby minimizing the corrosion of such elements by pesticides. Also, the preferred probe of the present transfer system substantially eliminates drippage of pesticide from the probe as it is removed from the pesticide container. Moreover, the collapsible shroud of the preferred probe protects users from contact with the surfaces of the probe which have been immersed into pesticide.

Although the best modes contemplated for carrying out the present invention have been herein shown and described, it will be apparent that modification and variation may be made without departing from what is regarded to be the subject matter of the invention.

What is claimed is:

1. An apparatus for transferring a selected volume of a first liquid from a first container to a second container and for rinsing the first container with a rinse liquid after the first container has been emptied comprising: means for supplying the rinse liquid; a nozzle assembly that is insertable into the first container including a suction tube for withdrawing liquid from the first container and a rinse tube for spraying the interior of the first container with the rinse liquid; rinse pump means communicating between said rinse tube and said rinse liquid supplying means for selectively pumping rinse liquid from said supplying means into said rinse tube; a measuring vessel; suction pump means communicating between said suction tube of the nozzle assembly, said measuring vessel and the second container to which the first liquid is to be transferred for withdrawing liquid into the suction tube and directing such liquid in part to the measuring vessel and in remaining part to the second container; means associated with the measuring vessel for indicating the total volume of liquid directed to the measuring vessel and the second container; and means communicating between said measuring vessel and said rinse tube for withdrawing the first liquid within the measuring vessel and mixing with the rinse liquid as the rinse liquid is pumped from said supplying means, said last-mentioned means being adapted to withdraw liquid from said measuring vessel at a flow rate which is greater than the flow rate of liquid concurrently directed into the measuring vessel.

2. The apparatus of claim 1 wherein said suction pump means includes a first motor, said rinse pump means includes a separate second motor, and said apparatus further includes control means for first energizing the first motor alone to direct a selected volume of first liquid into the measuring vessel and the second container and for thereafter energizing said first and second motors to concurrently pump rinse liquid into said rinse tube and pump the mixture of liquids into said suction tube.

3. The apparatus according to claim 1 further including a rinse receptacle into which the nozzle assembly may be inserted when it is desired to transfer the liquid within the measuring vessel to the second container without rinsing the first container.

4. The apparatus according to claim 3 wherein said nozzle assembly includes a valve mounted in the tip end of said suction tube for preventing drainage of any liquid therein when the nozzle assembly is removed from the first container and transferred to said rinse receptacle, said valve including an actuator adapted to be engaged by the bottom wall of the first container.

5. The apparatus according to claim 4 wherein the rinse tube is coaxially mounted about a portion of the suction tube that is spaced from the tip end in which the valve is mounted, the portion of the suction tube that is between the tip end and the rinse tube having an outer diameter equal to that of the rinse tube, the rinse tube terminating in an end that is spaced from the proximal portion of the suction tube to form a rinse port therebetween, and said nozzle assembly further including a normally extended collapsible tubular shroud adapted to collapse as the suction and rinse tubes are inserted into the first container.

6. An apparatus for transferring a solution such as pesticide from a supply container to a receiving container such as a sprayer tank and for selectively flushing the supply container after substantially all of the solution has been withdrawn therefrom comprising: means including a suction pump for extracting solution from the supply container, means which receives extracted solution from said extracting means for transferring the extracted solution concurrently to a receiving container and a measuring vessel, means associated with the measuring vessel for indicating the total volume of solution transferred to the receiving container and the measuring vessel, a source of rinse liquid, flushing means communicating with said source and including a rinse pump for selectively pumping the rinse liquid into the supply container to flush the supply container with the rinse liquid, means for withdrawing the solution previously transferred to said measuring vessel and mixing the solution with the rinse liquid directed to flush said supply container, control means for selectively energizing said suction and rinse pumps of said extracting means and said flushing means, said control means including first means for energizing said suction pump alone to enable an operator to transfer a desired total volume of solution to the measuring vessel and receiving container, and said control means including second means for concurrently energizing said suction and rinse pumps after the solution has been transferred to said measuring vessel to enable the operator to transfer such solution from the measuring vessel within the rinse liquid through the supply container to the receiving container.

7. The apparatus according to claim 6 wherein said extracting means and said flushing means include a common nozzle assembly which comprises coaxially arranged rinse and suction tubes which are insertable into the supply container, the suction tube extending coaxially within the rinse tube with an annular passageway formed therebetween that terminates in a rinse port.

8. The apparatus according to claim 7 further comprising a rinse receptacle for receiving the suction and rinse tubes of said nozzle assembly to enable the solution within the measuring vessel to be transferred with the rinse liquid to the receiving container without the use of the supply container.

9. The apparatus according to claim 7 wherein said nozzle assembly includes a normally closed valve secured in the inlet end of said suction tube, said valve having actuator means extending outwardly of said inlet end which may be engaged against the bottom wall of the supply container.

10. The apparatus according to either claim 7 or claim 9 wherein said nozzle assembly further comprises collapsible shroud that is normally extended to enclose said coaxial rinse and suction tubes, and means for urging said shroud into said normally extended position as the suction and rinse tubes are withdrawn from the supply container.

11. The apparatus according to claim 6 wherein said means for withdrawing solution from the measuring vessel and mixing the solution with the rinse liquid includes an induction valve having one inlet communicating with the outlet of said rinse pump, another inlet communicating with the outlet of said measuring vessel, and an outlet communicating with said supply container.

12. An apparatus for transferring a selected volume of liquid such as pesticide from a first container to a second container and for selectively rinsing the first container comprising: a suction tube that is insertable into said first container, a suction conduit extending from said suction tube, an extraction pump operatively connected to said suction tube, a transfer conduit communicating with said extraction pump which leads to said second container, a rinse tube which is coaxially mounted over the upper end of said suction tube and having a spray port at the lower end thereof which registers with the interior of said first container when said suction tube is inserted into said first container, a rinse conduit communicating with said rinse tube, a rinse pump connected to said rinse conduit, means for supplying water to said rinse pump, a measuring vessel having an inlet port and an outlet port, means connected to said transfer conduit for diverting a selected proportion of the flow through the transfer conduit from said extraction pump to the inlet of the measuring vessel, means communicating with the outlet port of said measuring vessel for educting the liquid within said measuring vessel into the water pumped through said rinse tube when said rinse pump means is activated, and control means for operating said extraction pump and said rinse pump for enabling said extraction pump to initially be energized alone to transfer liquid concurrently through said flow diverting means to said measuring vessel and said second container and to thereafter enable said extraction and rinse pumps to be concurrently energized to concurrently educt the liquid within said measuring vessel into the water pumped into the said supply container during said rinsing and to extract the mixture of water and liquid from the supply container and direct it to the second container.

13. In a transfer apparatus for transferring a liquid such as pesticide from a supply container to another container that includes a suction hose and a rinse hose, a nozzle assembly comprising: a suction tube including a small diameter upper section and a large diameter lower section, the upper section having an upper end communicating with the suction hose and a lower end communicating with the upper end of the large diameter lower section, a normally closed valve installed in the lower end of the large diameter lower section, said valve including an actuator for opening said valve which extends outwardly so that the valve may be opened by pushing the suction tube toward the bottom wall of the pesticide container, a rinse tube concentrically mounted about the small diameter upper section of the suction tube, said rinse tube having an upper end communicating with the rinse hose of the transfer apparatus and a lower end which is spaced from said upper end of the large diameter lower section of the suction tube to form a rinse port, and a collapsible, tubular shroud mounted coaxially about said suction and rinse tubes, and spring means for normally urging said shroud into an extended position that surrounds the rinse and suction tubes.

14. In the liquid transfer apparatus according to claim 13, wherein said shroud includes a tubular bellows, and said spring means comprises a coil spring within said bellows.

15. In the liquid transfer apparatus according to claim 13, wherein said upper end of large diameter lower section of said suction tube has an inwardly and downwardly tapered deflector surface that forms the lower surface of the rinse port.

16. In the transfer apparatus according to claim 13, said nozzle assembly further including a gasket mounted to the lower end of the shroud for wiping a liquid from the exterior surfaces of said large diameter lower section of said suction tube and of said rinse tube as the nozzle assembly is removed from the supply container.

* * * * *